(12) United States Patent
Bahar et al.

(10) Patent No.: US 11,318,421 B2
(45) Date of Patent: *May 3, 2022

(54) THIN WALL POLYETHER BLOCK AMIDE MEMBRANE TUBING AND MODULE

(71) Applicant: Xergy Inc., Harrington, DE (US)

(72) Inventors: Bamdad Bahar, Georgetown, DE (US); Taoli Gu, San Jose, CA (US); David McAndrews, Wilmington, DE (US); Abhishek Bandlore, Milford, DE (US)

(*) Notice: Subject to any disclaimer, the term of this patent is extended or adjusted under 35 U.S.C. 154(b) by 50 days.

This patent is subject to a terminal disclaimer.

(21) Appl. No.: 16/872,098

(22) Filed: May 11, 2020

(65) Prior Publication Data

US 2020/0353417 A1    Nov. 12, 2020

Related U.S. Application Data

(60) Provisional application No. 62/846,030, filed on May 10, 2019, provisional application No. 62/846,034, filed on May 10, 2019.

(51) Int. Cl.
| | | |
|---|---|---|
| *B01D 63/06* | (2006.01) | |
| *B01D 69/12* | (2006.01) | |
| *B01D 67/00* | (2006.01) | |
| *B01D 71/80* | (2006.01) | |
| *B01D 69/10* | (2006.01) | |

(Continued)

(52) U.S. Cl.
CPC ....... *B01D 63/062* (2013.01); *B01D 67/0086* (2013.01); *B01D 69/10* (2013.01); *B01D 69/122* (2013.01); *B01D 71/80* (2013.01); *C08G 69/40* (2013.01); *B01D 61/362* (2013.01); *B01D 71/26* (2013.01); *B01D 71/36* (2013.01); *B01D 2325/04* (2013.01); *B01D 2325/48* (2013.01)

(58) Field of Classification Search
CPC .......................... B01D 63/062; B01D 69/122; B01D 67/0086; B01D 71/80; B01D 69/10; B01D 2325/48; B01D 71/36; B01D 71/26; B01D 61/362; B01D 2325/04; B01D 71/56; B01D 71/52; B01D 63/065; B01D 69/02; B01D 63/061; C08G 69/40
See application file for complete search history.

(56) References Cited

U.S. PATENT DOCUMENTS

| | | | | |
|---|---|---|---|---|
| 2012/0080147 | A1* | 4/2012 | Offeman | B32B 38/10 156/305 |
| 2019/0338078 | A1* | 11/2019 | Pineau | C08G 69/40 |
| 2020/0001238 | A1* | 1/2020 | Bahar | B01D 61/362 |

OTHER PUBLICATIONS

Singha et al, "Structures, Properties, and Performances—Relationships of PolymericMembranes for PervaporativeDesalination", Membranes 2019, 9, 58; doi:10.3390/membranes 9050058.*

(Continued)

*Primary Examiner* — Krishnan S Menon

(57) ABSTRACT

Composite membrane tubing includes a porous scaffold support combined with polyether block amide copolymer. The composite membrane tubing has overlapping "fusion areas" that are an artifact of the manufacturing process. The methods of manufacturing above-mentioned composite membrane tubing have also been addressed. The composite membrane tubing can be reinforced with a structural mesh to further provide rigidity and strength. Composite membrane tubing or generally extruded tubing can be integrated into a multi-tube module for various applications.

20 Claims, 4 Drawing Sheets

(51) Int. Cl.
*C08G 69/40* (2006.01)
*B01D 71/36* (2006.01)
*B01D 71/26* (2006.01)
*B01D 61/36* (2006.01)

(56) References Cited

OTHER PUBLICATIONS

Wu et al., Tubular thermal crosslinked-PEBA/ceramic membrane for aromatic/aliphatic pervaporation. Journal of Membrane Science 486 (2015) 1-9.*

* cited by examiner

THIN WALL POLYETHER BLOCK AMIDE MEMBRANE TUBING AND MODULE

CROSS REFERENCE TO RELATED APPLICATIONS

This application claims the benefit of priority to U.S. provisional patent application No. 62/846,034, filed on May 10, 2019, and to U.S. provisional patent application No. 62/846,030, filed on May 10, 2019; the entirety of both applications are hereby incorporated by reference herein.

BACKGROUND OF THE INVENTION

Field of the Invention

The present invention relates to a composite membrane tubing system and their integration into pervaporation or heat/mass exchange systems such as drying or humidifying gases, purification, medical, analytical, HVAC and oil & gas applications. The process for manufacturing above-mentioned tubular systems is provided.

Background

Polyether block amides (PEBAs) are a family of high performance block copolymers consisting of soft polyether (PE) blocks and rigid polyamide (PA) blocks marketed under the PEBAX® and VESTAMID® brands by Arkema Inc and EVONIK Resource Efficiency Gmbh, respectively. Arkema first commercialized PEBAX® thermoplastic elastomers in 1981 as part of an initiative to develop "soft" nylon materials. PEBAX® has the general formula of: HO—(CO-PA-CO—O-PE-O)$_n$—H.

PA block is in a rigid semi-crystalline phase, which contributes to high end mechanical properties and can be optionally bio-based from 28 to 97%, according to ASTM D6866. While PE block has very low glass transition temperature, about −60° C. which provides outstanding properties at low temperature. In addition, PE block can be tuned to hydrophobic or hydrophilic.

PEBA is a high-performance thermoplastic elastomer with these following characteristics: resistance against a wide range of chemicals, low density among thermoplastic elastomers, superior mechanical and dynamic properties including, flexibility, impact resistance, energy return, fatigue resistance, and these properties are maintained at low temperature, such as lower than −40° C.

PEBA is used in medical products such as catheters for its flexibility, its good mechanical properties at low and high temperatures, and its softness.

It is also widely used in the manufacture of electric and electronic goods such as cables and wire coatings, electronic device casings, components, etc. PEBA can be used to make textiles as well as breathable film, fresh feeling fibers or non-woven fabrics. These compounds will find various applications in sports, optical, and electronics, where toughness and lightness are crucial. Some hydrophilic grades of PEBA are also used for their anti-static and anti-dust properties. Since no chemical additives are required to achieve these properties, products can be recycled at end of life.

Because of its unique copolymer structure, hydrophilic PEBA films offer a combination of mechanical strength, and ease of processing. Unlike microporous products, the monolithic structure of these PEBA films are a barrier to liquid water and bacteria and exhibit a high moisture vapor transmission rate (MVTR). Each of these advantages make PEBA films breathable. This material is ideal for many applications such as construction house-wrap films, breathable textiles for sports, packaging, and selective membranes.

To achieve even higher MVTR, PEBA films need to be very thin. However, thinner films demonstrate poor mechanical strength and dimensional stability. Traditionally, to date, thicker membranes are produced. Thicker membranes have high transmission resistance, and lower pervaporation performance. In fact, breathable PEBA films are generally melt extruded into a thin monolithic film above 25 microns, which limits their application.

SUMMARY OF THE INVENTION

The invention is related to ultra-thin composite PEBA tubes made from elastomeric polyether block amide (PEBA), preferably ultra-thin composite PEBA membranes and modules comprising these composite tubes. In an exemplary embodiment, a porous scaffold support, such as a porous polymeric material or membrane, is combined with PEBA to enable the reinforced composite membrane to be ultra-thin, wherein the wall thickness of the composite PEBA tube is less than 50 μm, and preferably less than 25 μm and more preferably less than 10 μm and even more preferably less than 5 μm. An ultra-thin composite PEBA film may be made into a PEBA pervaporation tube by wrapping a composite PEBA film and bonding or attaching the overlap areas. A composite PEBA tube can be made by spirally wrapping or longitudinally wrapping a composite PEBA film or wrapping a porous scaffold support around an ultra-thin walled extruded PEBA tube. A mandrel may be used for wrapping the composite PEBA film thereon. These thin composite PEBA tubes, may be used as pervaporation tubes that can be incorporated into a pervaporation module. The wrapped composite PEBA pervaporation tube may have fused areas wherein at least a portion of the overlap area is fused together.

The porous scaffold support may include a porous material and the PEBA may be coated thereon and may fill, at least partially the pores of the porous material or membrane. An exemplary porous scaffold support material is a porous polymer material of polyethylene or polypropylene, and may be a porous fluoropolymer material or membrane, such as an expanded fluoropolymer. An exemplary expanded fluoropolymer is expanded polytetrafluoroethylene (PTFE). An exemplary porous scaffold support material has a thickness that is less than about 25 microns, less than about 20 microns, less than about 10 microns and more preferably less than about 5 microns. A thin porous material is preferred as it will allow for higher rates of moisture transfer through the composite PEBA tube. A porous scaffold support, such as an expanded fluoropolymer or porous polyethylene or polypropylene, may have very small pores, wherein the average pores size is no more than about 10 microns, no more than about 5 microns, no more than about 1 micron, no more than about 0.5 microns and any range between and including the values provided. The average pore size can be determined use a coulter porometer, wherein the Minimum Pore Size is defined at the point where the wet curve meets the dry curve. The Mean Pore Size is defined as the point at which the amount of flow through the sample on the wet curve is exactly 50 percent of the amount of flow at the same pressure when the sample is dry. A small average pore size may be desirable to enable PEBA to imbibe into the pores of the porous scaffold material. The smaller the pore size the greater the capillary forces to pull the solution or melted PEBA therein.

The PEBA may be attached to the porous scaffold support by melt casting, wherein the PEBA is melted onto the porous scaffold support. The two layers may then be compresses to force the melted PEBA into the pores of the porous scaffold support. PEBA may also be solution cast onto or into the pores of a porous scaffold support. The PEBA may be dissolved in a solvent and the cast onto the porous scaffold support, wherein it may wick into the pores and substantially fill the pores to make a non-permeable composite film. In flat sheet assemblies, such as a vent or plate and frame pervaporation modules, it may be desirable to have minimal PEBA integration into the pores of the porous scaffold support and therefore melt casting may be preferred with little interpenetration of the PEBA into the pores. It is also possible to achieve a composite structure with minimal penetration by solution casting and tuning the solvent system to evaporate before the PEBA is able to penetrate the pore structure fully.

A composite PEBA film comprising the PEBA polymer and the porous scaffold support may be substantially non-porous, wherein the pores of the porous scaffold support are filled or blocked by the PEBA polymer such that the composite PEBA film has a Gurley densometer reading of about 100 seconds or more, and preferably 200 second or more; using a Gurley Densometer 4340 automatic densometer, from Gurley Precision Instruments, Troy N.Y.

The composite PEBA film may be wrapped to form a tube and may include overlap areas that are fused together. These overlap areas will be at least twice as thick as the composite PEBA film and therefore it may be desirable to keep the overlap area to a minimum percentage of the outer surface area of the composite PEBA tube, such as no more than about 30%, no more than about 25%, no more than about 20%, no more than about 10%, or even no more than about 5% outside surface area of the tube.

According to one embodiment of the present invention, there is provided a tubular structure made from a composite film of a porous scaffold support and PEBA copolymer. The tubular structures have overlapping fused areas.

According to one embodiment of the present invention, there is provided a process for the preparation of the composite membrane tubing by tape-wrapping a porous scaffold support around a mandrel. The mandrel is then passed through a heating chamber or an infrared chamber to fuse the wrapped tape into a continuous tubular structure. The tubular structure is then passed through a coating process wherein the membrane tube is coated with the PEBA copolymer. The assembly is then passed through heating chamber to dry the PEBA pervaporation tube. Then the tube is dipped in a swelling agent, such as water or a solvent, and removed from the mandrel. It may be necessary to provide internal pressure to the tube assembly to remove the PEBA tube from the mandrel.

According to one embodiment of the present invention, there is provided a process for the preparation of tubular structure adapted to pervaporate the fluid by spirally or longitudinally, also referred to as cigarette, wrapping one or more membranes around mandrel and using heat or infrared radiation on the assembly to fuse the wrapped membrane tapes into a continuous cylindrical tube. Then the tube is dipped in a swelling agent, such as water or a solvent, and removed from the mandrel. It may be necessary to provide internal pressure to the tube assembly to remove the PEBA tube from the mandrel. Note that an ultrasonic instrument, such as an ultrasonic welder, having an ultrasonic horn and anvil, such as a those available from Branson Ultrasonics Corp, Rochester N.Y., may be used to create very localized heat between the overlapped layers of the wrapped tube to fuse the layers together.

An alternative embodiment of the present invention involves extruding tubes to a very thin cross-sectional thickness and optionally reinforcing with a reinforcement after extrusion, such as by tape wrapping.

An exemplary PEBA composite film may include a biocide to prevent the formation of mold in a pervaporation module, as this is an ideal environment for mold to form. A biocide may be configured in the PEBA polymer, as a coating on the porous scaffold support, as a coating on the final PEBA layer, or a combination thereof. Any suitable biocide may be used and the concentration may be adjusted according to the use conditions.

According to one embodiment of the present invention, a tube reinforcement may be configured around the outside and/or inside of a composite PEBA tube to provide additional structural support and may comprise a structural mesh. A structural mesh may be configured around the PEBA tube(s) to provide additional structural rigidity. The structural mesh may comprise a plastic or metal material depending on the degree of reinforcement required. The metal may also be used to enhance heat transfer to the tubular structure to enhance pervaporation. The structural mesh may be secured on the ends of the tubular structure using an adhesive or a heat shrinking material, or a combination of the two.

According to one embodiment of the present invention, a method for putting fittings at the ends of the tubes is provided. The fittings may be coupled to the composite PEBA tube by inserting a rigid plastic tubing at the ends of the PEBA tubing, and inserting into the plastic tubing different kinds of fittings such as compression, barbed, push-to-connect, etc. The assembly may be secured on the ends of the tubular structure using an adhesive or a heat shrinking material, or a combination of the two. Alternatively, tubes, with or without fittings, are inserted into a setting compound, or potted, into a tube sheet or header.

The manufacturing processes described above ensure that the tubes are much thinner than those described in the prior art. The thinness of the tubes along with the inherent nature of the material ensures tubes which permeate water, water vapor or a polar species to transmit across the tube wall at higher rates and lower cost.

According to one embodiments of the present invention, there are provided devices such as modules that employ pervaporative tubing to dry incoming air streams for medical, analytical, electrochemical and oil & gas purposes. Several pervaporative tubes are forced into a cylindrical structure which constitutes the "shell". The pervaporative tubes are capped off and then dipped into potting resin. Once, the potting resin and seals all tubes in place, the process is repeated on the other end of the tubes. Finally, the ends are capped off with front and rear headers.

Ultra-thin PEBA composite membranes can be used to make tubes. These tubes are very strong, and therefore can take high pressure feed.

Because of the strength and thinness, there is less resistance to permeation and therefore higher performance systems.

Because of the ultra-thin structure, less material, both PEBA and porous scaffold support, are used to produce these tubes, therefore the units have inherently lower cost, and therefore the technology can be applied to wider range of applications beyond the current thick walled extruded tubes that are state-of-art in the market.

The pervaporation modules and pervaporation tubes comprising a PEBA copolymer and preferably an ultra-thin composite PEBA film are ideally suited for desalination, ionic liquid desiccation, waste processing, heat exchange, mass exchange and numerous other applications.

The desired ultra-thin composite PEBA tubing will also have the following merits: high dimensional stability; high moisture vapor transmission rate; lightweight; excellent toughness and tear resistance; easy for processing in a roll to roll scale up; low cost; anti-dust; recyclable; excellent virus and bacteria barrier; excellent liquid & odor barrier and hygienic.

The desired ultra-thin reinforced composite PEBA film should have the following features: no curl, easy to handle; good dimensional stability; high MVTR; lightweight; excellent toughness and tear resistance; easy to process in high volume, such as a roll to roll system; low cost; recyclable; flexible; act as an excellent virus and bacteria barrier; and be an excellent liquid & odor barrier and be hygienic.

Example 1

In one embodiment, an ultra-thin reinforced composite PEBA film is prepared by dissolving the PEBA, MV1074 from Arkema Inc., in ethanol/toluene (50 wt %: 50 wt % mix) at a 15% weight ratio. The mixture was stirred at 60° C. until homogenous and translucent. The PEBA polymer solution was then applied to a microporous polytetrafluoroethylene material which is tensioned around a chemically-resistant plastic frame. The polymer solution was then poured on to the microporous scaffold. The membrane was dried at room temperature. The final thickness of the membrane was 5 microns.

Example 2

In another embodiment, an ultra-thin reinforced composite PEBA film is prepared by dissolving the PEBA MH1657 polymer from Arkema Inc., in ethanol and water at a 20% weight ratio. The mixture was stirred until homogenous and translucent. The PEBAX® MH1657 polymer was then applied to a microporous polyethylene material using a doctor blade. The membrane was dried at room temperature for 8 hours. The membrane was then annealed in the oven for 5 minutes at 80° C. The final thickness of the membrane was 5 microns.

Example 3

In another embodiment, an ultra-thin reinforced composite PEBA/PFSA film is prepared by dissolving the 1.6 g PEBA polymer from Arkema Inc. and 0.4 g PerfluoroSulfonicAcid, (PFSA) in ethanol and water at a 20% weight ratio i.e. 2 grams of total polymer to 8 grams of solvent. The mixture was stirred until homogenous and translucent. The PEBA/PFSA blend polymer was then applied to a microporous polyethylene material with a doctor blade. The film was dried at room temperature for 24 hours. The final thickness of the film was 15 microns.

It will be apparent to those embodiments mentioned above can be scaled up to a roll-to-roll, continuous process.

Example 4

In another embodiment, an ultra-thin reinforced composite PEBA film is prepared by melt lamination of PEBA, MH1657 at about 20 micron onto expanded polytetrafluoroethylene (ePTFE) support scaffold materials. MH1657 was hot pressed with ePTFE at 200° C. for 90 seconds. The film was 7 micron and transparent.

The summary of the invention is provided as a general introduction to some of the embodiments of the invention and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description explain the principles of the invention.

Figure 1:
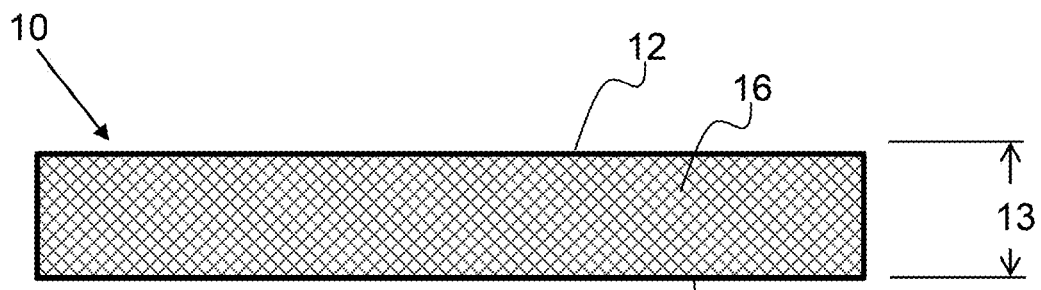
FIG. 1 shows cross-sectional view of an exemplary porous scaffold support having a porous structure and pores therein, wherein the PEBA substantially fills the pores of the scaffold support.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

As shown in FIG. 1, an exemplary an ultra-thin porous scaffold support 10 is a thin sheet or porous membrane having a top side 12, bottom side 14 and pores 16 therethrough from the top to the bottom. An exemplary porous scaffold support is a planar sheet of material having a thickness of less than 50 microns, and preferably less than 25 microns, as described herein.

Figure 2:
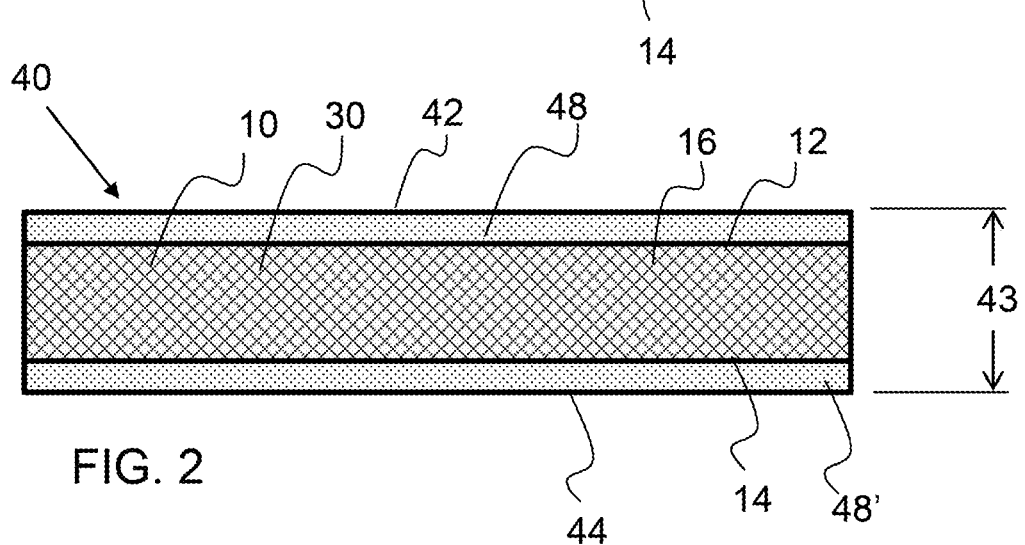
FIG. 2 show a cross-sectional view of an exemplary ultra-thin composite PEBA film having a layer of PEBA on either side of the porous scaffold support.

As shown in FIG. 2, an exemplary ultra-thin composite PEBA film 40 has PEBA polymer 30 imbibed into the pores 16 of the porous scaffold support 10. This may be accomplished by melt laminating and pressing PEBA resin into the pores of the porous scaffold material, or through solution casting or imbibing. The composite PEBA film has a top surface 42 and a bottom surface 44 and a thickness 43 therebetween. The thickness of the composite PEBA film is preferably less than 50 microns, more preferably less than 25 microns and even more preferably less than 10 or 5 microns. There is a PEBA butter coat layer 48, 48' extending across the top and bottom surfaces, respectively. A butter coat layer is a think layer of the PEBA copolymer extending over the porous scaffold support. A butter-coat layer may be on one or both surfaces of the composite PEBA film.

Figure 3:
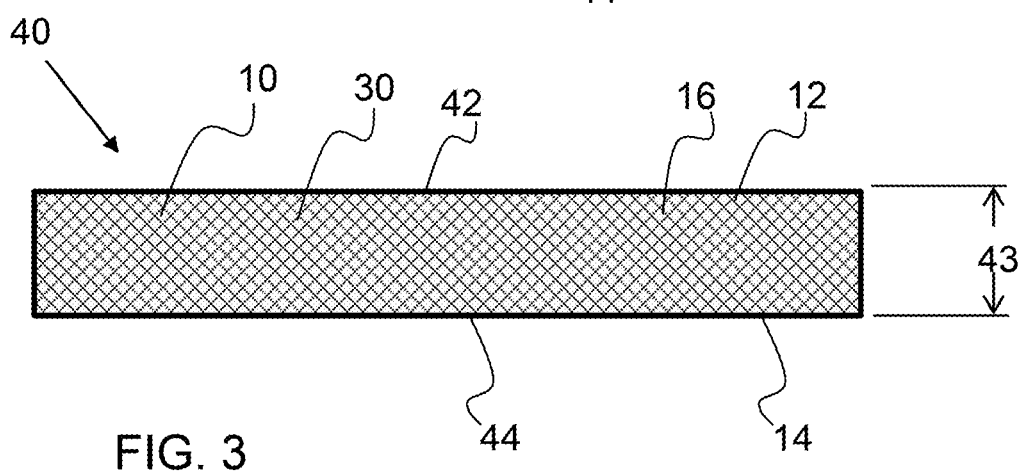
FIG. 3 shows cross-sectional view of an exemplary ultra-thin composite PEBA film formed by imbibing PEBA copolymer into a porous scaffold support using solution casting process, wherein the PEBA substantially fills the pores of the scaffold support.

As shown in FIG. 3, an exemplary ultra-thin composite PEBA film 40 has PEBA polymer 30 imbibed into the pores 16 of the porous scaffold support 10. This may be accomplished by melt laminating and pressing PEBA resin into the pores of the porous scaffold material, or through solution casting or imbibing. In this embodiment, there is no butter-coat layer.

Figure 4:
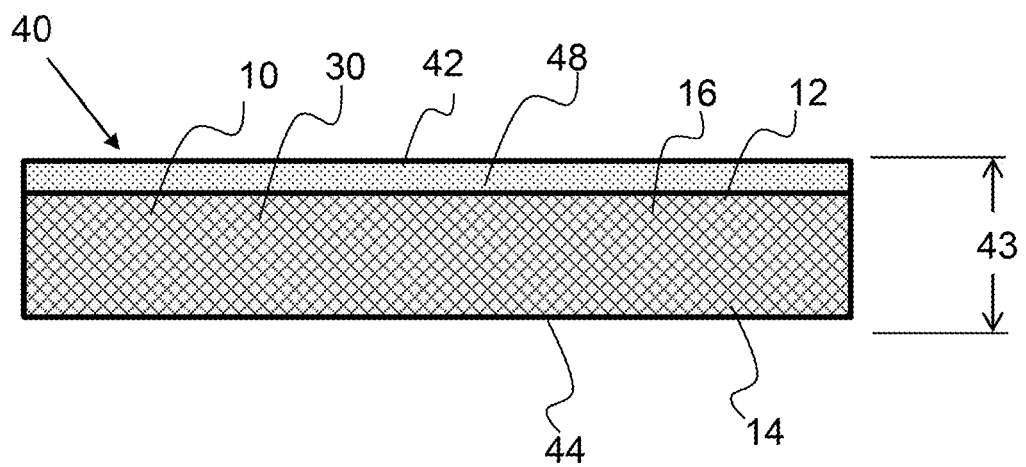
FIG. 4 shows a cross-sectional view of a composite PEBA film having a butter-coat layer of PEBA on the surface of a porous scaffold support.

As shown in FIG. 4, a composite PEBA film 40 has a butter-coat layer 48 of PEBA copolymer 30 on the top side 12 or surface of a porous scaffold support 10. This thin composite PEBA film may be used in a flat sheet in a pervaporation module or in a humidification vent application to allow humidity to pass therethrough but to exclude other contaminants or particles from entering an enclosure. As shown in FIG. 4, a flat sheet of a composite PEBA film may be made for plate and frame configurations. IT may be preferable to use this single sided butter-coat layer composite PEBA film for these applications as the PEBA may be very thin, such as less than 10 microns or even more preferably less than 5 microns.

Figure 5:
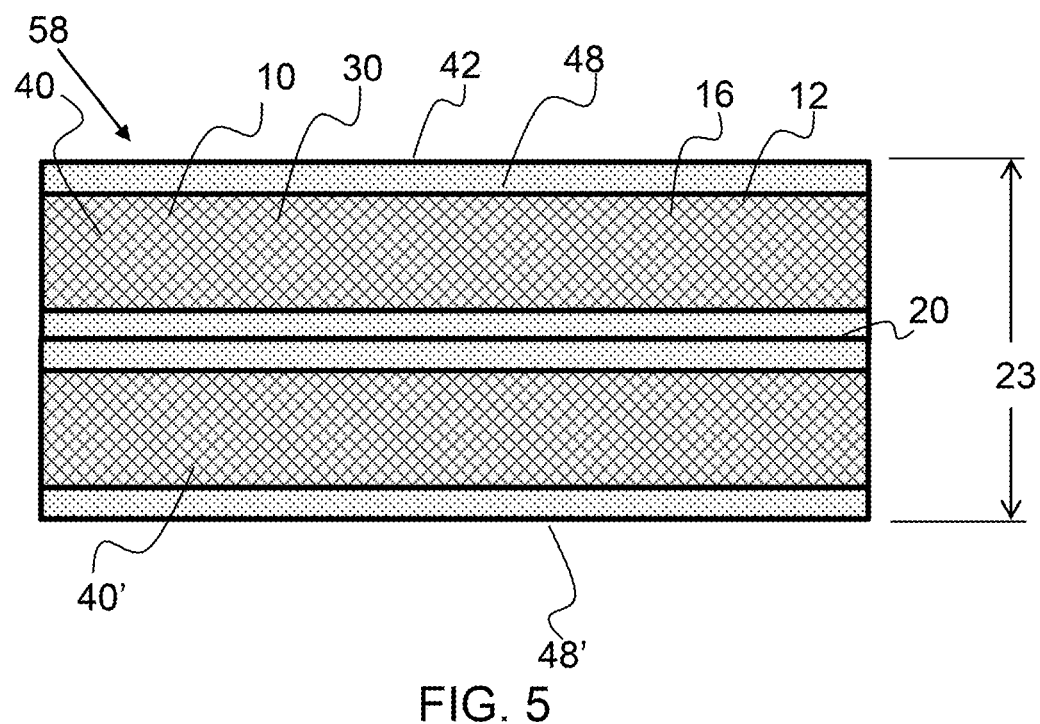
FIG. 5 shows a cross-sectional view of an overlap region of a composite PEBA tube having two layers of composite PEBA film.

FIG. 5 shows a cross-sectional view of an overlap area 58 of a composite PEBA tube having two layers of composite PEBA film 40 and 40'. The overlap area is fused together along the fused interface 20 which may include PEBA from one butter-coat layer melting into the PEBA of the adjacent butter-coat layer. Note that PEBA from one composite PEBA film may melt into the pores or other PEBA polymer in an adjacent composite PEBA film. The thickness of the overlap area 58 or layers 23 is greater than the thickness of a single composite PEBA film, and therefore reducing the overlap area is important to increase throughput and permeation rates through the tube.

Figure 6:
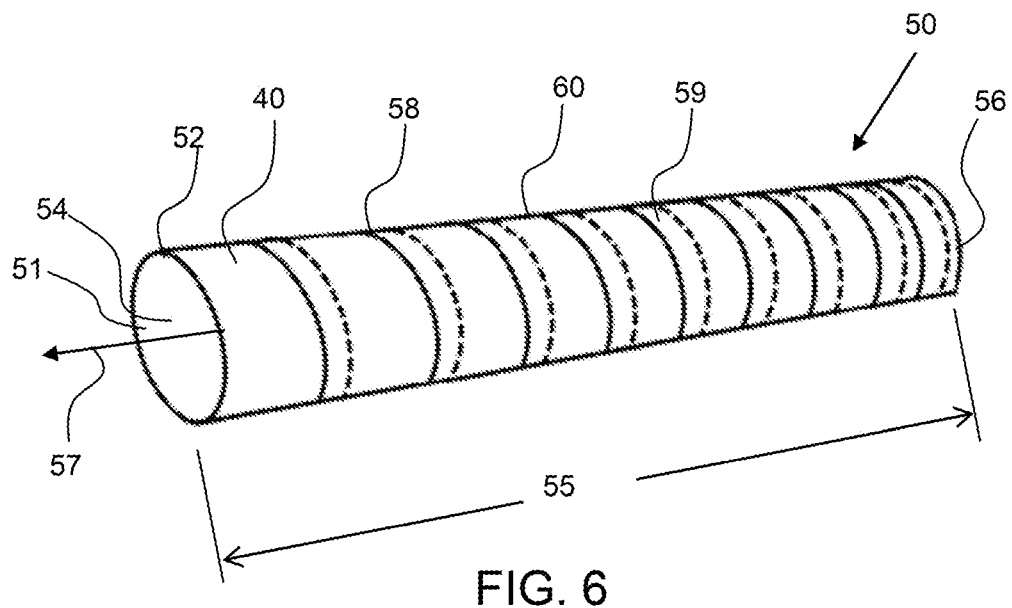
FIG. 6 shows a perspective view of an exemplary PEBA tube that is a spirally wrapped PEBA tube comprising a spirally wrapped composite PEBA film having overlap areas that are attached form a spiral wrapped PEBA tube.

As shown in FIG. 6, a composite PEBA tube 50 is a spirally wrapped PEBA tube 60 having a composite PEBA film 40 spirally wrapped to form the outer wall 52 and conduit 51 of the spirally wrapped PEBA tube. The spirally wrapped PEBA tube has overlap areas 58 that spiral around the tube. The composite PEBA film that may be attached or bonded to each other to form bonded area 59. The bonding may be formed by fusing the layers together, wherein the PEBA from one layer is intermingled with the PEBA of the second, or overlapped layer. This bonding may be accomplished through heat, such as by fusing or by the addition of a solvent that enables intermingling of the polymers. The composite PEBA tube 50 has a length 55 from an inlet 54 to an outlet 56 and a length axis 57 extending along the center of the tube. A first layer of the composite PEBA film is bonded to the PEBA polymer of a second layer of the composite PEBA film to form the bonded area. As described herein, the overlap width may be fraction of the tape width, such as no more than about 30% of the tape width, no more than about 25% of the tape width, no more than about 20% of the tape width, no more than about 10% of the tape width, or even no more than about 5% of the tape width to provide a high percentage of the spiral wrapped tube that is only a single layer, thereby increase the rate of transfer of ions through the tube and also reduce the total usage of film thus lower cost.

Figure 7:
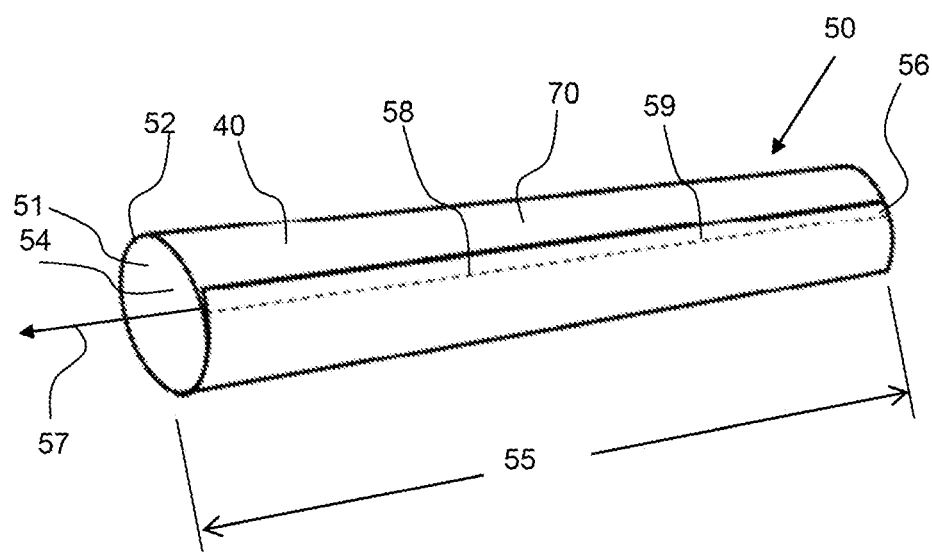
FIG. 7 shows a perspective view of an exemplary PEBA tube that is a longitudinally wrapped PEBA tube comprising a spirally wrapped composite PEBA film having overlap areas that are attached form said cigarette wrapped PEBA tube.

As shown in FIG. 7, a composite PEBA tube 50 is a longitudinally wrapped PEBA tube 70 having a composite PEBA film 40 longitudinally wrapped to form the longitudinally wrapped PEBA tube and tube conduit 51. The longitudinally wrapped PEBA tube has an overlap area 58 of the composite PEBA film that extends down along the length 55 or length axis 57 of the tube. The length extends from the inlet 54 to the outlet 56. The overlap area may be attached or bonded to each other to form a fused area 59 wherein the layers of the composite PEBA film are bonded or fused together, wherein the PEBA from one layer is intermingled with the PEBA of a second layer through melting or solvent bonding. The bonding may be formed by fusing the layers together, wherein the PEBA from one layer is intermingled with the PEBA of the second, or overlapped layer. This bonding may be accomplished through heat, such as by fusing or by the addition of a solvent that enables intermingling of the polymers. An exemplary composite PEBA pervaporation tube comprises a longitudinally wrapped, or "cigarette wrapped" composite PEBA film sheet to form a longitudinal wrapped PEBA pervaporation tube. The composite PEBA film is wrapped around the longitudinal axis of the tube. In this embodiment the length of the tube is the width of the composite PEBA membrane, and the wrap angle is perpendicular to the longitudinal axis. The longitudinal wrapped PEBA membrane has an overlap area having an overlap width. Again, the overlap width may be no more than about 30% of the tape width, no more than about 25% of the tape width, no more than about 20% of the tape width, no more than about 10% of the tape width, or even no more than about 5% of the tape width to provide a high percentage of the spiral wrapped tube that is only a single layer, thereby increase the rate of permeation and transfer of ions through the tube.

Figure 8:
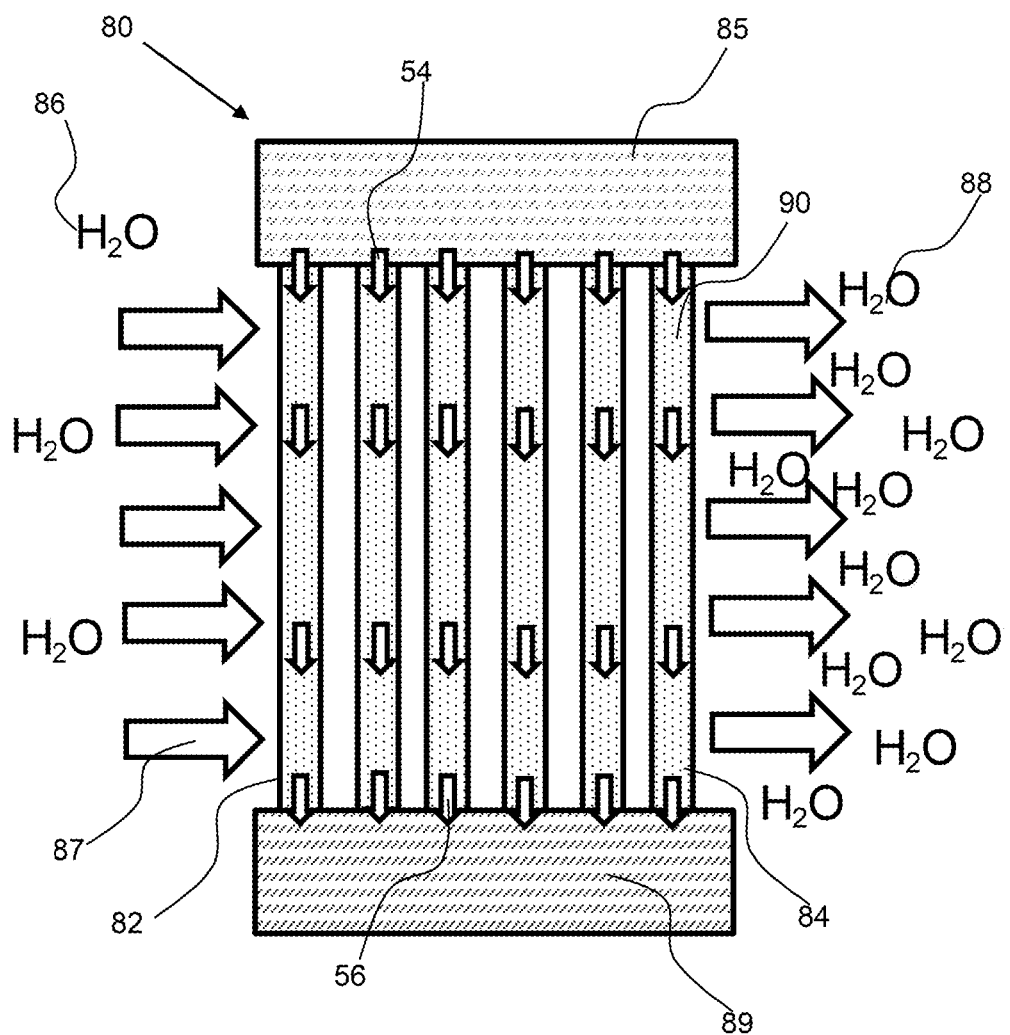
FIG. 8 shows pervaporation module compromising a plurality of composite PEBA pervaporation tubes.

FIG. 8 shows a pervaporation module 80 comprises a plurality of PEBA pervaporation tubes 82 that are composite PEBA pervaporation tubes 84. Each of the tubes is coupled to an inlet tube sheet 85 and outlet tube sheet 89. A flow of water flows through the plurality of tubes from the inlet 54 to the outlet 56 of the tube. An airflow 87 passes over the tubes to pull away moisture. The inlet relative humidity 86 may be much lower than the outlet relative humidity 88. Each of the composite PEBA tubes may further comprise a tube support 90, which is an additional support structure or tube that extends around the composite PEBA tubes to prevent expansion of the composite PEBA tubes under pressure. The water flowing through the tubes may be pressurized to increase permeation therethrough and a tube support may prevent diameter creep or swelling. A tube support may be a net or screen that is resistant to radial forces that would increase the diameter and may be made of rigid polymer material and/or a metal, such as a porous metal tube including, but not limited to a, perforated metal tube or woven metal tube.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. An ultra-thin composite PEBA tube comprising:
    a) a composite PEBA film comprising:
        i) a porous scaffold support; and
        ii) a PEBA copolymer attached to the porous scaffold support;
        iii) a thickness of no more than 50 microns;
    b) an overlap area of the composite PEBA film that is fused to form said PEBA tube;
    c) an inlet;
    d) an outlet;
    e) a length from said inlet to said outlet.

2. The ultra-thin composite PEBA tube of claim 1, wherein the composite PEBA film thickness is no more than 25 microns.

3. The ultra-thin composite PEBA tube of claim 1 wherein the composite PEBA film thickness is no more than 10 microns.

4. The ultra-thin composite PEBA tube of claim 1, wherein the composite PEBA film thickness is no more than 5 microns.

5. The ultra-thin composite PEBA tube of claim 1, wherein the overlap area is no more than 30% of an outside surface area of the composite PEBA tube.

6. The ultra-thin composite PEBA tube of claim 1, wherein the overlap area is no more than 20% of an outside surface area of the composite PEBA tube.

7. The ultra-thin composite PEBA tube of claim 1, wherein the overlap area is no more than 10% of an outside surface area of the composite PEBA tube.

8. The ultra-thin composite PEBA tube of claim 1, wherein the composite PEBA film is spirally wrapped to form said composite PEBA tube.

9. The ultra-thin composite PEBA tube of claim 1, wherein the composite PEBA film is longitudinally wrapped to form said composite PEBA tube.

10. The ultra-thin composite PEBA tube of claim 1, wherein the porous scaffold support is expanded polytetrafluoroethylene membrane.

11. The ultra-thin composite PEBA tube of claim 1, wherein the porous scaffold support comprises a porous polyethylene membrane.

12. The ultra-thin composite PEBA tube of claim 1, wherein the porous scaffold support comprises a porous polypropylene membrane.

13. The ultra-thin composite PEBA tube of claim 1, further comprising a biocide to prevent mold formation.

14. An ultra-thin composite PEBA tube comprising:
    a) a PEBA tube;
    b) a porous scaffold support attached to an outer surface of the PEBA tube; and
    c) an inlet;
    d) an outlet;
    e) a length from said inlet to said outlet.

15. The ultra-thin composite PEBA tube of claim 13, wherein the porous scaffold support is spirally wrapped around the PEBA tube.

16. The ultra-thin composite PEBA tube of claim 13, wherein the porous scaffold support is longitudinally wrapped around the PEBA tube.

17. A pervaporation module comprising:
    a) an ultra-thin composite PEBA tube comprising:
        i) composite PEBA film comprising:
            a porous scaffold support; and
            a PEBA copolymer attached to the porous scaffold support;
            a thickness of no more than 50 microns;
        ii) an overlap area of the composite PEBA film that is fused to form said PEBA tube;
        iii) an inlet;
        iv) an outlet;
    b) an inlet tube sheet sealed to the inlet of the composite PEBA tube;
    c) an outlet tube sheet sealed to the outlet of the composite PEBA tube;
    d) a flow of water through the composite PEBA tube from the inlet tube sheet to the outlet tube sheet;
    e) a flow of fluid over the ultra-thin composite PEBA tube;
    wherein water vapor passes through the composite PEBA tube and into the flow of fluid thereover to increase the relative humidity of the flow of fluid.

18. The pervaporation module of claim 17, comprising a plurality of composite PEBA tube comprising coupled to the inlet and outlet tube sheets.

19. The pervaporation module of claim 17, wherein the composite PEBA film comprises a biocide.

20. The pervaporation module of claim 17, further comprising a tube support configured around the ultra-thin composite PEBA tube.

* * * * *